No. 643,789. Patented Feb. 20, 1900.
L. EDERER.
ALARM BED.
(Application filed May 13, 1899.)
(No Model.)
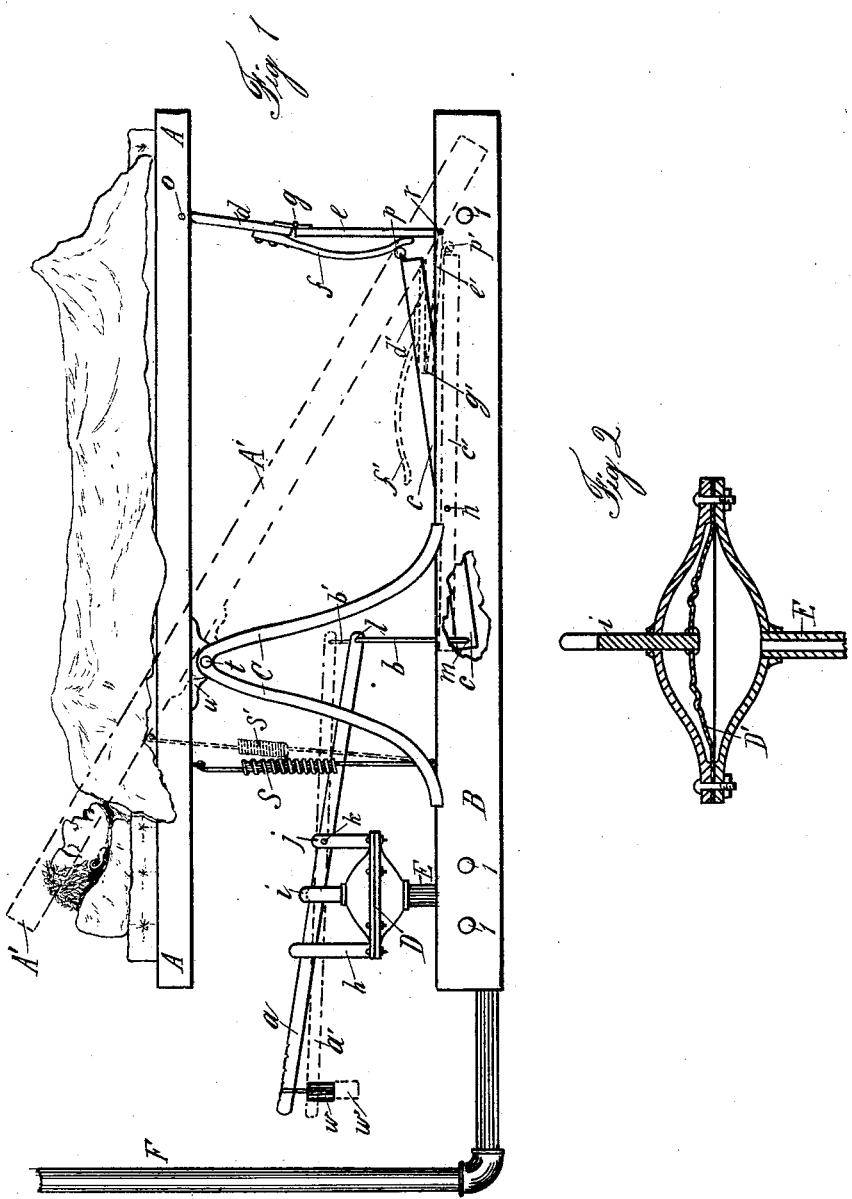
WITNESSES.
C. F. Patterson
W. A. Dodsworth
INVENTOR
Ludwig Ederer
PER Geo. W. Sues.
ATTORNEY.

UNITED STATES PATENT OFFICE.

LUDWIG EDERER, OF OMAHA, NEBRASKA.

ALARM-BED.

SPECIFICATION forming part of Letters Patent No. 643,789, dated February 20, 1900.

Application filed May 13, 1899. Serial No. 716,775. (No model.)

*To all whom it may concern:*

Be it known that I, LUDWIG EDERER, residing at Omaha, in the county of Douglas and State of Nebraska, have invented certain useful Improvements in Alarm-Beds; and I do hereby declare that the following is a full, clear, and exact description of the invention, such as will enable others skilled in the art to which it appertains to make and use the same, reference being had to the accompanying drawings, which form a part of this specification.

This invention has relation to an improvement in alarm-beds.

The object of my invention is to provide a bed to be used more particularly in connection with hothouses and conservatories and is arranged in such a manner that should the steam in the heating-pipes fall below a certain pressure it will tilt the bed to awaken the sleeper having charge of the heating plant.

In the accompanying drawings I have shown in Figure 1 an alarm-bed embodying my invention, showing the bed as tilted in dotted lines, while Fig. 2 shows an enlarged detail, detached, of a diaphragm by means of which the bed is operated.

In small hothouses the heating plants usually comprise a steam-heating system the water of which is raised to the proper temperature in an ordinary boiler. These steam-heating plants are so arranged that the heat can never raise to a point dangerous to the plant-life within the hothouse; but to make provisions preventing the temperature from falling below a certain point is more difficult, as the boilers are usually of small capacity, so that the fires cannot be very conveniently regulated. In my present invention I provide an alarm-bed which is in direct connection with the steam-heating system and which is so arranged that as soon as the steam falls down to a certain point the bed tilts to awaken the sleeper, who then has an opportunity to replenish the fire.

My invention embodies, essentially, two sills B, from which extend upward two brackets C, which brackets above are provided with a pin T, working through the bracket U, secured to the bed-frame A, as is shown in Fig. 1. These lower sills B are united by suitable stay-rods $l\ l$.

Pivotally secured to the bed A, which in turn is also pivotally secured to the brackets C, is a simple bar $d$, from which extends rod $f$, which rod projects beyond the bar $d$.

Hinged to the bar $d$ is a second bar $e$, a hinge securing the same, and this second bar $e$ is secured by means of a rod $r$, which passes from one sill to the other, so that the bed A is secured to the sills B by means of two hinged sections $d$ and $e$, as is shown in Fig. 1. The rod $f$, it will be noticed, is slightly curved and extends nearly to the bottom of the rod $e$. While the bar $e$ is preferably held in a vertical position, the upper bar $d$ extends therefrom at an angle, so that the bars $d$ and $e$ are only kept from closing upon one another by means of the latching mechanism described more fully hereinafter.

Passing from one sill B to the other is an iron rod $n$, which pivotally supports an ordinary bar $c$, which bar at one end is provided with a little roller $p$, which rides upon the rod $f$, as is shown in Fig. 1.

Secured below the bed A is an ordinary diaphragm-chamber D, within which is held an ordinary diaphragm D', as is shown in Fig. 2, and this diaphragm-chamber is in pipe connection with one of the steam-pipes F, forming part of the heating plant.

Extending upward from the diaphragm D, is an operating-bar $i$, the upper end of which is bifurcated and is adapted to receive a portion of the pivoted lever $a$, which at the point K is pivoted to a bracket $j$. This lever $a$ in turn is connected to the pivoted lever $c$, as is shown.

Extending from the bed A to a suitable portion of the sills B is an ordinary coil-spring S, so that the bed A, without a load, is normally held in a horizontal position by the spring.

The bed, as has been stated, will always be drawn into a horizontal position by means of the spring S and will be locked by means of the hinged bars $d$ and $e$, when the roller $p$ of the lever C rides against the rail F to prevent these hinged sections $d$ and $e$ from folding inward toward and upon the lever $c$, so that as long as the lever C rides against the rod $f$ the bed will be rigidly locked. Now the movement of the lever C depends upon the position of the lever *a*, and the position of this lever *a* is determined by the position of the stem *i*, secured to the diaphragm D', so that as long as any steam-pressure is within the pipe F the diaphragm D' will be forced upward, so that the levers *a* and *c* will be in a position to lock the bed in a horizontal position. The bed A would collapse if the hinged parts *d* and *e* were not locked, for the reason that the bed dips away from the hinge, and so normally tends to close the same because of the bed being pivoted nearer the head end than the foot. Now, however, as the steam-pressure in the boiler and the connected pipes F decreases, the diaphragm D gradually sinks downward, following the diminishing pressure within the pipe system until the roller *p* rides off of the rail and below the bar *e*, when the weight of the sleeper upon the bed insures the tilting of the bed, so that the sleeper will slide or roll off, thus reminding him that the steam within the pipe system is below a certain point, endangering the life of the plants within the greenhouse. After the operator has replenished his fire the steam of course promptly carries the diaphragm up again, so that the bed, which had been in a horizontal position, by means of the spring S will be locked and ready to receive the occupant, and it will be held in a locked position until the steam in the boiler again falls below a certain point.

While I have shown the bars *d* and *e* hinged and united, it is of course understood that some other suitable locking mechanism could be employed without departing from the spirit of my invention.

Having thus described my said invention, what I claim as new, and desire to secure by United States Letters Patent, is—

1. The combination of a movable bed, of a diaphragm in pipe connection with the heating system, a latching mechanism to normally lock said bed in a natural position, and connections between said latching mechanism and said diaphragm to release said latching mechanism to move said bed.

2. The combination with a pivoted bed, of a spring to normally hold said bed in proper position, a locking mechansm to support said bed, a lever to lock said latching mechanism in one position, and a diaphragm connected to said lever to actuate the same to latch and release said locking mechanism.

3. The combination with a suitable support, of a bed tiltedly secured to said support, a spring to normally hold said support in a horizontal position, a locking mechanism normally in a locked condition to support said bed, a diaphragm in pipe connection, a lever secured to said diaphragm, and a second lever adapted to lock and release said locking mechanism, said last-mentioned lever and said diaphragm-lever being suitably connected, as and for the purpose set forth.

LUDWIG EDERER.

In presence of—
GEORGE W. SUES,
MABEL A. DODSWORTH.